United States Patent [19]

Share

[11] 3,882,246

[45] May 6, 1975

[54] TREATMENT OF SKELETAL MUSCLE DISORDERS WITH CYCLOBENZAPRINE

[75] Inventor: Nathan Norman Share, Cote St. Luc, Quebec, Canada

[73] Assignee: Merck & Co., Inc., Rahway, N.J.

[22] Filed: Apr. 9, 1974

[21] Appl. No.: 459,748

Related U.S. Application Data

[63] Continuation-in-part of Ser. Nos. 145,875, May 21, 1971, abandoned, and Ser. No. 328,192, Jan. 31, 1973, abandoned.

[52] U.S. Cl. ............................................. 424/330
[51] Int. Cl. .......................................... A61k 27/00
[58] Field of Search ................................... 424/330

[56] References Cited
UNITED STATES PATENTS
3,454,643   7/1969   Cope et al. ............... 260/570.8 TC

OTHER PUBLICATIONS

Parkes, Progress in Medicinal Chemistry, by Ellis & West (1961), pp. 72 and 92–94.

*Primary Examiner*—Stanley J. Friedman
*Attorney, Agent, or Firm*—James A. Arno; Harry E. Westlake; Rudolph J. Anderson, Jr.

[57] ABSTRACT

The present invention relates to a pharmaceutical composition providing a dosage unit of from 1 to 20 mg. of cyclobenzaprine and salts thereof useful as a skeletal muscle relaxant. It also relates to a method of treating muscular spasm and other similar muscular disorders associated with or caused by injury or arising spontaneously with no known cause by the administration of a pharmaceutical composition containing cyclobenzaprine or a salt thereof as one of the active ingredients.

5 Claims, No Drawings

TREATMENT OF SKELETAL MUSCLE DISORDERS WITH CYCLOBENZAPRINE

The present application is a continuation-in-part of copending application Ser. No. 145,875, filed May 21, 1971 (now abandoned) and copending application Ser. No. 328,192, filed Jan. 31, 1973 (now abandoned).

The present invention relates to a pharmaceutical composition providing a dosage unit of from 1 to 20 mg. of cyclobenzaprine and salts thereof useful as a skeletal muscle relaxant. It also relates to a method of treating muscular spasm and other similar muscular disorders associated with or caused by injury or arising spontaneously with no known cause by the administration of a pharmaceutical composition containing cyclobenzaprine or a salt thereof as one of the active ingredients.

BACKGROUND

Muscle spasm or spasticity and related clinical disorders involving muscle hyperactivity or increase in muscle tone affect a large section of the population. Such clinical disorders involving muscle hyperactivity include the spasticity of cerebral origin which may arise from brain injury or tumor. Another related disorder which is of great importance especially in the treatment of children 6 to 14 years of age is cerebral palsy. Other clinical disorders involving tonic skeletal muscular hyperactivity are Parkinson's disease especially characterized by muscular spasticity and muscular rigidity and muscle spasm of traumatic origin including low-back and cervical spine syndromes, many orthopedic deformities, arthritic states, myositis, whiplash injuries, fractures, dislocations, cramps, sciatica and spinal cord injuries. At present a variety of medicinals are used in an attempt to relieve or correct the clinical disorders involving muscle hyperactivity including muscle spasm and spasticity and the pain associated therewith. But use of these various materials unfortunately is attended by concomitant side effects and toxicity which limit the usefulness of these medicinals. There is an unsatisfied need at the present time for a medication which has a high specific effect on muscle hyperactivity causing various clinical disorders when administered either by the oral or parenteral route and which at the same time has a minimum of side effects or contraindications.

DETAILED DESCRIPTION

It is an object of the present invention to develop a method for treating clinical disorders involving muscle hyperactivity such as muscle spasm and spasticity as well as related problems of muscle rigidity or splinting including Parkinson's disease and multiple sclerosis in human patients by the administration of a safe but effective dose of cyclobenzaprine of the formula

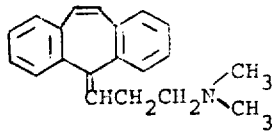

or a pharmaceutically acceptable non-toxic salt thereof.

It is a further object of the present invention to develop a method of effecting relaxation of skeletal muscles by the administration to the afflicted patient of from about .05 to about 4 mg./kg. of cyclobenzaprine or a pharmaceutically acceptable non-toxic acid addition salt thereof.

Another object of the present invention is to provide a method for selectively reducing skeletal muscle tonic hyperactivity without effecting any loss in normal muscle strength or causing any attendant sedation, behavioral effects or other effects ordinarily associated with central nervous system depressants.

A still further object of the invention is to provide compositions in unit dosage form comprising from 1 to 20 mg. of cyclobenzaprine or an acid addition salt thereof useful in the treatment of muscular spasm.

It is a further object of the present invention to provide methods and compositions for the alleviation of muscle tonic hyperactivity including muscular spasm, spasticity and rigidity without the attendant side effects of sedation, loss of normal muscle strength, depression, and other objectionable pharmacological effects. It is a still further object of this present invention to provide a centrally acting agent comprising a unit dose of from 2–20 mg. of cyclobenzaprine which will selectively reduce skeletal muscle tonic hyperactivity without causing central nervous system depression. These and other more specific objects will be apparent from the following description and claims.

The present invention provides, in the form of a pharmaceutical formulation of cyclobenzaprine, a centrally acting agent which selectively reduces skeletal muscle tonic hyperactivity without reducing normal muscle strength.

The compositions of the present invention are preferably presented for administration in unit dosage form as tablets, pills, capsules, powders, granules, sterile parenteral solutions or suspensions and the like. For preparing solid compositions such as tablets, the principal active ingredient is mixed with a pharmaceutical carrier, i.e., conventional tableting ingredients such as corn starch, lactose, sucrose, sorbitol, talc, stearic acid, magnesium stearate, dicalcium phosphate, gums, and other pharmaceutical diluents, e.g., water, to form a solid preformulation composition containing a homogeneous mixture of cyclobenzaprine or a pharmaceutically acceptable non-toxic acid addition salt thereof admixed with the pharmaceutical carrier. When referring to these preformulation compositions as homogeneous, it is meant that the active ingredient, i.e., cyclobenzaprine or salt thereof, is dispersed evenly throughout the composition so that the composition may be readily subdivided into equally effective unit dosage forms such as tablets, pills, capsules, and the like. This solid preformulation composition is then subdivided into unit dosage forms of the type described above containing from 1 to 20 mg. of cyclobenzaprine or salt per unit dose. In a preferred mode of preparing the unit dose compositions of the invention, the cyclobenzaprine salt, preferably the hydrochloride salt, is mixed with a pharmaceutical carrier in a proportion of about one part of the active ingredient per hundred parts of formulation by weight. In this manner, tablets containing between 2 and 20 mg. of cyclobenzaprine hydrochloride per tablet are prepared by mixing the appropriate amount of cyclobenzaprine hydrochloride with appropriate amounts of lactose or other suitable sugar, starch (preferably corn starch), and a salt of stearic acid. The mixture is suitably granulated and compressed into tablets containing between 1 and 20 mg. of the active ingredient per tablet. The tablets or pills of the novel composition can be coated or otherwise compounded to provide a dosage form affording the advantage of prolonged action of the cyclobenzaprine or salt thereof. For example, the tablet or pill can comprise an inner dosage and an outer dosage component, the latter being in the form of an envelope over the former. The two components can be separated by an enteric layer which serves to resist disintegration in the stomach and permits the inner component to pass intact into duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A form which is in part enteric coated is particularly useful for the purpose of the present invention since the compositions of the present invention are characterized by their rapid onset of action when administered in conventional oral dosage form, e.g., simple compressed tablets and the like.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinyl-pyrrolidone, gelatin and the like.

The formulations of cyclobenzaprine and a pharmaceutically acceptable salt are normally administered orally, parenterally or rectally. Orally, they may be administered in tablets, capsules, suspensions or syrups, the preferred dosage form being a compressed tablet containing from 1–20 mg. of the active ingredient, for example, cyclobenzaprine hydrochloride per tablet. The optimum dosage depends of course on the dosage form being used and the type and severity of the condition being treated. In any specific case, the appropriate dosage selected will further depend on factors of the patient which may influence response to the drug, for example, general health, age, weight, etc. Age in particular appears to be a definite factor in selecting the appropriate dosage. Thus, children appear to tolerate more of the drug on a mg./kg. basis than normal adults. Although the optimum quantities of cyclobenzaprine or acid addition salt to be used in such manner depends on the particular salt employed in the particular type of muscular condition treated, oral dose levels of the preferred formulation in the range of 0.05 to 2 mg./kg. per day show excellent effectiveness in adults, especially in the range of 0.1 to 0.4 mg./kg. per day. In children, on the other hand, the dose levels employed in various conditions range from 0.05 to 5 mg. per day. The doses employed for example in the treatment of children affected with cerebral palsy are in the order of approximately 4 mg./kg. per day. Within this noted range, the dosage must, of course, be adjusted to the need of the patient taking into account the particular disease condition and other factors including general health, weight, etc. Comparative dosages are used in parenteral or rectal administration. The daily dosages are expressed as mg. of cyclobenzaprine base per kilogram of patient body weight per day.

The compound used as the active ingredient in the composition of the present invention is cyclobenzaprine or a pharmaceutically acceptable salt thereof. Cyclobenzaprine is a tricyclic amine compound of the formula

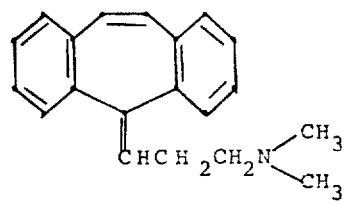

which is described in U.S. Pat. No. 3,454,643 of Arthur C. Cope and Edward L. Engelhardt, as a substance useful in tranquillizing animals or humans, and is incorporated herein by reference. The compound cyclobenzaprine is most easily administered in the form of a non-toxic acid addition salt. Such salts are prepared by methods known in the art. One such method utilized in the preparation of the preferred salt, cyclobenzaprine hydrochloride, is described in Example 1 of the above-noted patent of Cope and Engelhardt and involves precipitation of the salt from a solution of cyclobenzaprine in chloroform by saturating the solution with dry hydrogen chloride and cooling the solution to cause precipitation of solid cyclobenzaprine hydrochloride. Other salts, which are prepared in accordance with similar methods known to the art are those salts, the acid component of which is pharmaceutically acceptable in the intended dosages. Such salts include those prepared from cyclobenzaprine base and one of the group of acids including hydrochloric acid, hydrobromic acid, sulfuric acid, nitric acid, phosphoric acid, methane sulfonic acid, acetic acid, maleic acid, tartaric acid, lactic acid, salicylic acid and other similarly constituted acids used as the acid component of amine base acid addition salts for pharmaceutical administration.

The compositions of this invention, specifically cyclobenzaprine or a pharmaceutically acceptable non-toxic acid addition salt thereof, preferably cyclobenzaprine hydrochloride admixed with a pharmaceutically acceptable non-toxic carrier, are administered to patients suffering from skeletal muscle spasm or related muscular disorders to selectively reduce skeletal muscle tonic hyperactivity in the afflicted patient without reducing normal muscle strength. The compositions of cyclobenzaprine are unusually specific in their muscle relaxant properties and the administration of the compositions of cyclobenzaprine or a salt in either oral or injectable form results in an extremely rapid onset of action of the medication. The administration of the compositions of the present invention is also surprisingly free from any toxic reactions or side effects resulting from the medication. This is completely unexpected since the above-cited patent mentions the use of higher dosage levels of the drug to quiet or tranquillize cattle. Remarkably, at the dosage levels recommended for the treatment of muscular spasm, there is a complete absence of any tranquillizing effect or other noticeable behavioral effects.

The unusual and selective effect of cyclobenzaprine in reducing muscle hyperactivity associated with spasm has been demonstrated in test animals in comparison with other centrally active agents reported to have some muscle relaxant activity. In such tests cyclobenzaprine is shown to be highly effective as a spasmolytic agent (reduces skeletal muscle hyperactivity) with no ataxia (failure of muscle coordination) at the effective dose levels. Other compounds tested were not effective at this level without displaying ataxia and other evidence of loss of muscle strength.

The compositions of cyclobenzaprine are administered in unit dosages of from 1–20 mg. of cyclobenzaprine present as an acid addition salt, e.g., cyclobenzaprine hydrochloride. Thus, in one preferred mode of treatment of muscular spasm, an average adult patient is treated by the daily administration of from 1 to 4–10 mg. tablets of cyclobenzaprine hydrochloride at equally spaced intervals. If for some reason oral administration is not recommended, the patient suffering from muscular spasm or other related disorders is treated by the injection, preferably by the intravenous route, of approximately 1 ml. of sterile aqueous solution containing from 1–20 mg., preferably about 10 mg. of a salt of cyclobenzaprine, preferably cyclobenzaprine hydrochloride. If patient or physician preference dictates, other modes of administration, i.e., intramuscular injection, rectal administration and the like may be employed. However, because of the extreme rapid onset of action in either the oral or intravenous mode of administration, there is rarely a need for other routes of administration.

The following are detailed examples showing the preparation of the pharmaceutical compositions of this invention. They are to be construed only as illustrations of said compositions and not intended as limitations thereof.

EXAMPLE 1

A 10-MILLIGRAM TABLET OF CYCLOBENZAPRINE

Formula

| | |
|---|---|
| Cyclobenzaprine hydrochloride | 10 g. |
| Lactose USP | 65 g. |
| Corn Starch USP | 20 g. |
| Magnesium stearate USP | 0.5 g. |

A batch of 1000, 10-mg. tablets of cyclobenzaprine is prepared by mixing the ingredients listed above as follows.

The cyclobenzaprine, lactose and a portion of the corn starch are mixed and granulated with a 10% corn starch paste. The resulting granulation is sieved and blended with magnesium stearate and the remainder of the corn starch. The resulting granulation is then compressed into tablets containing 10 mg. of cyclobenzaprine hydrochloride per tablet. Corresponding tablets containing respectively 2 mg., 5 mg. and 20 mg. of cyclobenzaprine hydrochloride per tablet are prepared using the same procedure but varying the amount of cyclobenzaprine hydrochloride added to the mixture in the appropriate ratio.

EXAMPLE 2

OTHER 10-MILLIGRAM TABLETS OF CYCLOBENZAPRINE

The procedure of Example 1 is repeated using the same ingredients with the exception of cyclobenzaprine hydrochloride which is replaced with an equimolar amount of the acid addition salt of cyclobenzaprine and hydrobromic acid.

The procedure of Example 1 is repeated using the same ingredients with the exception of cyclobenzaprine hydrochloride which is replaced with an equimolar amount of the acid addition salt of cyclobenzaprine and sulfuric acid.

The procedure of Example 1 is repeated using the same ingredients with the exception of cyclobenzaprine hydrochloride which is replaced with an equimolar amount of the acid addition salt of cyclobenzaprine and nitric acid.

The procedure of Example 1 is repeated using the same ingredients with the exception of cyclobenzaprine hydrochloride which is replaced with an equimolar amount of the acid addition salt of cyclobenzaprine and phosphoric acid.

The procedure of Example 1 is repeated using the same ingredients with the exception of cyclobenzaprine hydrochloride which is replaced with an equimolar amount of the acid addition salt of cyclobenzaprine and methane sulfonic acid.

The procedure of Example 1 is repeated using the same ingredients with the exception of cyclobenzaprine hydrochloride which is replaced with an equimolar amount of the acid addition salt of cyclobenzaprine and acetic acid.

The procedure of Example 1 is repeated using the same ingredients with the exception of cyclobenzaprine hydrochloride which is replaced with an equimolar amount of the acid addition salt of cyclobenzaprine and maleic acid.

The procedure of Example 1 is repeated using the same ingredients with the exception of cyclobenzaprine hydrochloride which is replaced with an equimolar amount of the acid addition salt of cyclobenzaprine and tartaric acid.

The procedure of Example 1 is repeated using the same ingredients with the exception of cyclobenzaprine hydrochloride which is replaced with an equimolar amount of the acid addition salt of cyclobenzaprine and lactic acid.

The procedure of Example 1 is repeated using the same ingredients with the exception of cyclobenzaprine hydrochloride which is replaced with an equimolar amount of the acid addition salt of cyclobenzaprine and salicylic acid.

EXAMPLE 3

A 10-MILLIGRAM TABLET OF CYCLOBENZAPRINE

Formula

| | |
|---|---|
| Cyclobenzaprine hydrochloride | 10 g. |
| Microcrystalline cellulose | 65 g. |
| Corn starch USP | 20 g. |
| Magnesium stearate USP | 0.5 g. |

A batch of 1000 10-mg. tablets of cyclobenzaprine is prepared by mixing the ingredients listed above as follows.

The cyclobenzaprine, microcrystalline cellulose and a portion of the corn starch are mixed and granulated with a 10% corn starch paste. The resulting granulation is sieved and blended with magnesium stearate and the remainder of the corn starch. The resulting granulation is then compressed into tablets containing 10 mg. of cyclobenzaprine hydrochloride per tablet. Corresponding blets containing respectively 2 mg., 5 mg. and 20 mg. of cyclobenzaprine hydrochloride per tablet are prepared using the same procedure but varying the amount of cyclobenzaprine hydrochloride added to the mixture in the appropriate ratio.

EXAMPLE 4

INTRAVENOUS SOLUTION OF CYCLOBENZAPRINE HYDROCHLORIDE

A solution containing 10 mg. of cyclobenzaprine hydrochloride per milliliter of injectable solution is prepared in the following manner. A mixture of 10 mg. of cyclobenzaprine hydrochloride and 50 mg. of Mannitol NF is dissolved in sufficient water for injection to make 1 ml. of solution. The solution is prepared and stored in such a manner that it is suitably protected from the deleterious effects of the atmosphere. One method by which this can be accomplished is by preparation and storage of the solution in an atmosphere of nitrogen. The resulting solution is sterilized by autoclaving. The above example is given for a unit dose of cyclobenzaprine but the same procedure may be appropriately employed to make larger amounts of solution by utilizing the appropriate ratio of cyclobenzaprine hydrochloride, Mannitol NF and water for injection. Other intravenous solutions having different concentrations of cyclobenzaprine are prepared by utilizing 2, 5 or 20 mg. of cyclobenzaprine hydrochloride per ml. of solution.

EXAMPLE 5

A FILM-COATED TABLET OF CYCLOBENZAPRINE

Ingredients

| | |
|---|---|
| Cyclobenzaprine hydrochloride | 10 mg. |
| Lactose | 107 mg. |
| Corn starch USP | 32 mg. |
| Magnesium stearate USP | 1 mg. |

Appropriate multiples of the above amounts are used as required.

The cyclobenzaprine, lactose, and a portion of the corn starch are mixed and granulated with a 10% corn starch paste. The resulting granulation is sieved, dried and blended with the remainder of the corn starch and the magnesium stearate. The resulting granulation is then compressed into tablets containing 10 mg. of cyclobenzaprine hydrochloride per tablet.

FILM COATING

Ingredients

| | |
|---|---|
| 1.28 mg. | Hydroxypropylmethylcellulose |
| 1.28 mg. | Hydroxypropylcellulose |
| 0.35 mg. | Titanium Dioxide |
| 0.09 mg. | Yellow Light Lemon Dye |
| 43.00 ml. | Ethanol Anhydrous |
| 43.00 ml. | Chloroform NF |

The amounts of ingredients are appropriately multiplied for the number of tablets required to be coated. Dissolve with agitation the hydroxypropylmethylcellulose and the anhydrous ethanol and add with mixing the hydroxypropylcellulose, titanium dioxide and the yellow light lemon dye and chloroform. When the mixture is homogeneous, it is homogenized and used to film coat the appropriate number of tablets.

Similar tablets of 2.5, 5 and 20 mg. are prepared using minor variations in the formulation as follows:

| | 2.5 mg. | 5 mg. | 20 mg. |
|---|---|---|---|
| Cyclobenzaprine hydrochloride | 2.5 | 5.0 | 20.0 |
| Lactose | 56.1 | 72.0 | 210.0 |
| Corn starch USP | 16.0 | 23.0 | 69.0 |
| Magnesium stearate | 0.4 | 0.5 | 1.8 |

What is claimed is:

1. A method for treating patients afflicted with disorders involving skeletal muscle hypertonic activity selected from the group consisting of muscle spasm, muscle spasticity, muscle rigidity or muscle splinting which comprises administering to said patient a therapeutically effective and safe dosage of cyclobenzaprine of the formula

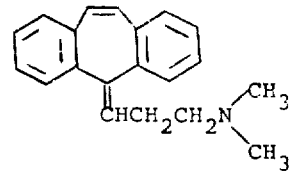

or a pharmaceutically acceptable non-toxic acid addition salt thereof in an amount between 0.05 to 5 mg./kg./day of said cyclobenzaprine or salt to selectively reduce skeletal muscle hypertonic activity without significantly reducing normal muscle strength or coordination.

2. A method according to claim 1 wherein the unit dosage administered is from 1–20 mg.

3. A method according to claim 2 in which the cyclobenzaprine is administered orally.

4. A method according to claim 2 in which the cyclobenzaprine is administered parenterally.

5. A method according to claim 1 wherein the cyclobenzaprine is administered in the form of the hydrochloride.

* * * * *